(12) United States Patent
Hu et al.

(10) Patent No.: US 6,267,173 B1
(45) Date of Patent: *Jul. 31, 2001

(54) COLLECTION BOX WITH AN INTEGRATED RESERVOIR FOR A HEAT EXCHANGER, IN PARTICULAR FOR A REFRIGERATION CONDENSER

(75) Inventors: Zaiqian Hu, Guyancourt; Pierre Sabathie, Maurepas; Michel Guerand, Saint Soupplets, all of (FR)

(73) Assignee: Valeo Thermique Moteur, LaVerriere (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/164,062

(22) Filed: Sep. 30, 1998

(30) Foreign Application Priority Data

Oct. 2, 1997 (FR) .................................................. 97 12284

(51) Int. Cl.⁷ ................................ F28D 1/06; F28B 1/00; F25B 39/04
(52) U.S. Cl. .......................... 165/132; 165/110; 165/174; 62/509
(58) Field of Search .................................. 165/132, 174, 165/110; 62/509

(56) References Cited

U.S. PATENT DOCUMENTS 5,203,407 * 4/1993 Nagasaka .............................. 165/174
5,537,839    7/1996 Burk et al. .
5,546,761 * 8/1996 Matsuo et al. .......................... 62/509
5,586,600 * 12/1996 Cribari .................................. 165/174
5,649,588    7/1997 Lee .
5,765,633    6/1998 Hu .

FOREIGN PATENT DOCUMENTS

3720483 A1 * 1/1988 (DE) .
42 38 853    5/1994 (DE) .
42 38 853A1 * 5/1994 (DE) .
43 18 058   12/1994 (DE) .
43 30 214    3/1995 (DE) .
43 30 214A1 * 3/1995 (DE) .
0 798 519    3/1996 (EP) .
96 03695     3/1996 (FR) .
2 735 851   12/1996 (FR) .
9700844   * 1/1997 (FR) .

* cited by examiner

Primary Examiner—Ira S. Lazarus
Assistant Examiner—Tho Van Duong
(74) Attorney, Agent, or Firm—Morgan & Finnegan, LLP

(57) ABSTRACT

A collection box with an integrated reservoir for a heat exchanger, has a cylindrical tubular wall and a separation wall, disposed inside the tubular wall to delimit a collection compartment and a reservoir compartment. The tubular wall is equipped with spaced holes to receive the ends of tubes of a bundle of tubes. The separation wall comprises a central core prolonged on either side by a first edge region and by a second edge region having profiles each designed and suitable to be applied and soldered against the inside of the tubular wall.

9 Claims, 2 Drawing Sheets

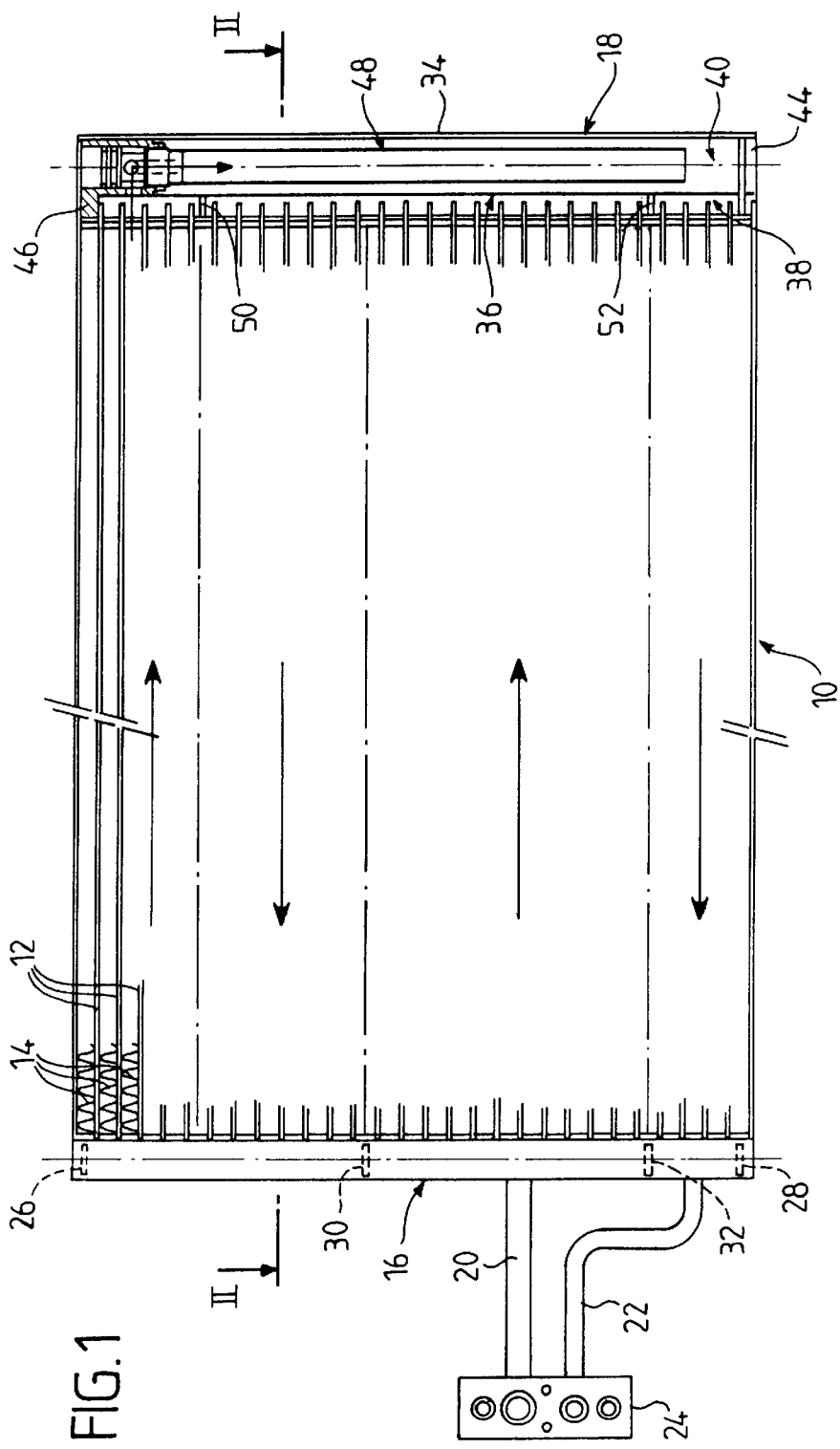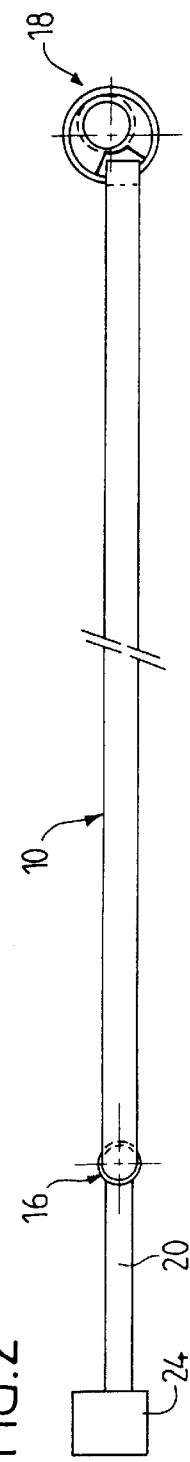

COLLECTION BOX WITH AN INTEGRATED RESERVOIR FOR A HEAT EXCHANGER, IN PARTICULAR FOR A REFRIGERATION CONDENSER

FIELD OF THE INVENTION

The invention relates to a collection box with an integrated reservoir for a heat exchanger.

BACKGROUND OF THE PRESENT INVENTION

It is known to provide a refrigeration circuit comprising a condensor having a collection box, through which a refrigeration fluid flows, for example for an air conditioning installation of an automobile vehicle.

In a refrigeration circuit of this type, the refrigeration fluid in the superheated vapour phase is sent, by means of a compressor, to a condenser in which it is successively cooled or "de-superheated", condensed into a warm liquid phase, then "under-cooled" to a cold liquid phase.

The refrigeration fluid, previously condensed and cooled, is then passed, through a pressure reducing valve, to an evaporator where it exchanges heat with a flow of air to be sent into the passenger compartment of the vehicle. In the said evaporator, the refrigeration fluid is changed into the vapour phase whilst the flow of air is cooled to supply the conditioned air. The refrigeration fluid in the vapour phase leaves the evaporator to reach the compressor, and so on.

The condenser comprises in the usual manner a bundle of tubes equipped with fins and mounted between two collection boxes, one of which communicates with a reservoir.

In French patent application No. 96 03695, the applicant has suggested the use of a condenser with an integral reservoir, in which the collection box and the reservoir are delimited by the same casing. The latter comprises a cylindrical tubular wall and a separation wall disposed inside the tubular wall to delimit a collection compartment and a reservoir compartment, the tubular wall being equipped with spaced holes to receive the ends of the tubes of a bundle of tubes.

The separation wall is then slid longitudinally into the inside of the tubular wall and fixed to the latter by soldering to delimit the collection compartment and the reservoir compartment.

Recently, in French patent application No 97 00844, the applicant has suggested a different solution using a separation wall comprising a central core prolonged by a first edge region having an inwardly curved profile suitable for application against the inside of the tubular wall and for soldering to the latter and by a second edge region adapted to be introduced into a longitudinal slit in the tubular wall and to be soldered to the latter.

SUMMARY OF THE INVENTION

The present invention suggests yet another way in which to integrate the collection box and the reservoir in a common casing, in order to improve the operations of fitting and soldering of the separation partition to the inside of the tubular wall.

According to the present invention there is provided a collection box with an integrated reservoir for a heat exchanger, comprising a cylindrical tubular wall and a separation wall, disposed inside the tubular wall to delimit a collection compartment and a reservoir compartment, the tubular wall being equipped with spaced holes to receive the ends of tubes of a bundle of tubes, wherein the separation wall comprises a central core prolonged on either side by a first edge region and by a second edge region having profiles each designed and suitable to be applied and soldered against the inside of the tubular wall.

As a result the separation wall is fixed to the tubular wall by two edge regions having profiles adapted to the interior shape of the tubular wall, which makes possible a better fixing by soldering.

In a first preferred embodiment of the invention, the tubular wall is a circular cylinder and the first and the second edge regions each have profiles like portions of a circular cylinder.

In another preferred embodiment of the invention, the tubular wall comprises a portion of a circular cylinder and at least one portion of a flat-sided cylinder whereas the first and the second edge regions have, respectively, the profile of part of a circular cylinder and the profile of part of a flat-sided cylinder.

Preferably, the tubular wall comprises two adjacent longitudinal border regions and one of the edge regions of the separation wall covers the two longitudinal border regions of the tubular wall.

In this manner a better joint and a better seal is ensured at the connection of the longitudinal border regions of the tubular wall.

The said longitudinal border regions may be either of the flush joint type, joined at their respective cut edges, or border regions folded towards the outside of the collection box and joined together.

The first and second edge regions of the separation wall may have many different shapes.

Usually, the first and the second edge region extend to substantially the same extent.

However, it is possible to make them extend to different extents.

In a preferred embodiment of the invention, the first and second edge regions of the separation wall have adjacent respective longitudinal edges.

This results in a doubling of the tubular wall in the region common with the reservoir.

According to another characteristic of the invention, the central core of the separation wall comprises a part which is a portion of a circular cylinder.

Another aspect of the invention relates to a heat exchanger comprising a bundle of tubes positioned between a collection box as described above and another collection box.

BRIEF DESCRIPTION OF THE DRAWINGS

In the following description, given solely by way of example, reference is made to the attached drawings in which:

FIG. 1 is a view in longitudinal cross-section of a collection box comprising an integrated reservoir in accordance with the invention, FIG. 2 is a view in transverse cross-section along the line II—II in FIG. 1.

DESCRIPTION OF THE PREFERRED EMBODIMENTS

Figure 3:
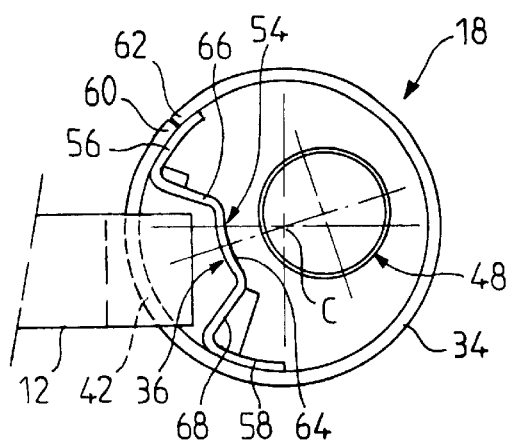
FIG. 3 is a partial view on an enlarged scale of FIG. 2 showing in detail the collection box comprising an integrated reservoir.

Reference is made first of all to FIGS. 1 and 2 which show a condenser intended to form part of an air conditioning installation of an automobile vehicle.

The condenser comprises a bundle 10 formed of a plurality of flat parallel tubes 12 between which elements 14 of a substantially undulating shape are inserted forming heat exchanger fins.

The bundle 10 is mounted between a tubular collection box 16 and a tubular housing 18. The collection box 16 has a circular transverse cross-section and it is equipped with an inlet pipe 20 and an outlet pipe 22 for a refrigeration fluid. The pipes 20 and 22 are connected to a connection box 24 designed to be connected to other components of the air conditioning installation. The collection box 16 is equipped with two end walls 26 and 28 and two internal partitions 30 and 32, which make it possible to delimit three compartments communicating with tubes of the bundle of tubes.

The tubular box 18 (FIGS. 1, 2 and 3) comprises a tubular wall 34 having the shape of a circular cylinder with a centre C (FIG. 3).

The tubular wall 34 houses internally a separation wall 36 (FIGS. 1 to 3) designed to delimit a collection compartment 38 and a reservoir compartment 40. The collection compartment 38 communicates with the tubes in the bundle by means of spaced holes 42 provided in the tubular wall to receive the ends of the tubes.

The tubular casing 18 is closed in the lower part by an end wall 44 and in the upper part by an end wall 46 delimiting an opening for the introduction of a removable cartridge 48 containing a filter and a desiccating agent, the said cartridge extending longitudinally in the interior of the reservoir compartment 40.

The collection compartment 38 is divided by incomplete partitions 50 and 52 (FIG. 1).

The refrigeration fluid, in the form of a superheated vapour phase is sent, by means of a compressor (not shown) to the inlet pipe 20. Then the refrigeration fluid circulates in the condenser following a path of four parallel passes, as shown by the arrows. The said fluid is successively cooled or "de-superheated", condensed into a warm liquid phase, then "under-cooled" to a cold liquid phase, before leaving the condenser through the outlet pipe 22.

The reservoir compartment 40 communicates with the collection compartment 38 and makes it possible to compensate the variations in volume of refrigeration fluid inside the condenser.

Reference will now be made more particularly to FIG. 3 to describe the structure of the tubular casing 18 forming the collection box with an integrated reservoir.

The dividing wall 36 comprises a central core 54 connected to two edge regions 56 and 58 each having the shape of part of a circular cylinder adapted to closely match the inside shape of the tubular wall 34. The latter is formed by rolling a metal sheet and bringing together its longitudinal edges 60 and 62. The edge regions 56 and 58 extend to substantially the same extent, that is to say they extend over substantially the same angular interval. The marginal edge 56 is located so that it extends on either side of the longitudinal edges 60 and 62 of the tubular wall in order to cover them.

The core 54 of the wall 36 comprises a central portion 64 having the shape of part of a circular cylinder and two radial portions 66 and 68 which abut the two edge regions 56 and 58. Extensions of the radial portions 66 and 68 would pass through the centre C of the tubular wall 34.

The separation wall 36 is slid into the interior of the tubular wall 34, then soldered to the latter in a position such that the two edge regions 56 and 58 become applied closely against the interior part of the tubular wall 34. This results in a better fixing by soldering. Moreover, because the edge region 56 then bridges the longitudinal edges 60 and 62 of the tubular wall, a better sealing is obtained.

Figure 4:
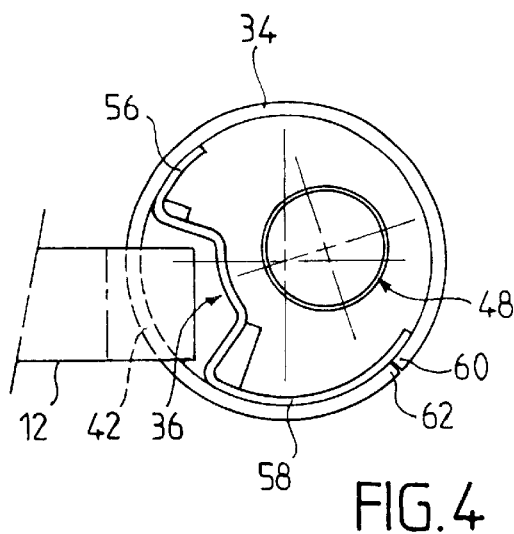
FIGS. 4 to 7 are similar views to that shown in FIG. 3 of other embodiments of the invention.

In the embodiment shown in FIG. 4, the edge regions 56 and 58 of the separation 36 extend to different extents, the edge region 58 extending over an angular interval greater than that of the edge region 56, so as to cover the longitudinal edges 60 and 62 of the tubular wall 34.

Figure 5:
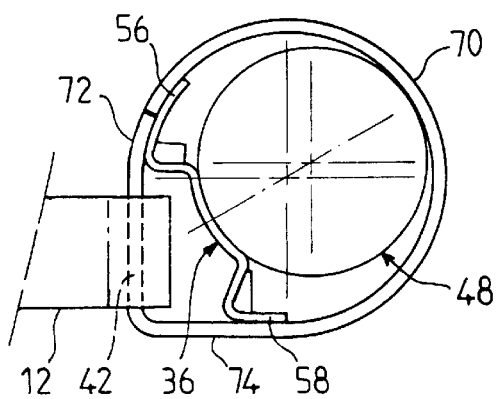

In the embodiment shown in FIG. 5, the tubular wall 34 comprises a circular cylinder portion 70 and two flat-sided cylinder portions 72 and 74, the two latter forming an angle of about 90° between them. Slots 42 are formed in the flat-sided cylinder portion 72 which serve to receive the ends of the pipes.

The edge region 56 has the shape of a portion of a circular cylinder and becomes applied against the inside of the tubular wall 34, bridging the edges 60 and 62. On the other hand, the edge region 58 has the shape of portion of a flat-sided cylinder and becomes applied against the flat-sided cylinder portion 74.

Figure 6:
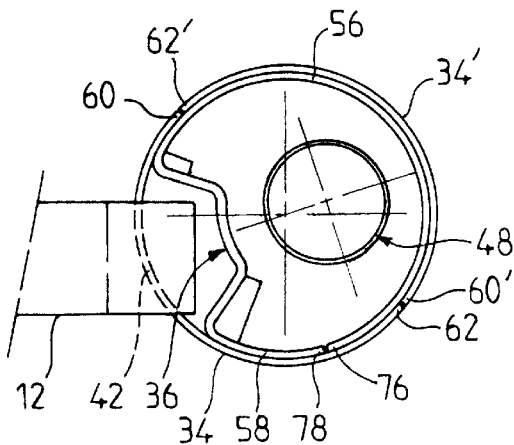

In the embodiment shown in FIG. 6, the tubular wall comprises two parts 34 and 34' each forming a semi-circular half of a cylinder and joined together at the longitudinal edges 60 and 62 and 60' and 62'. The two edge regions 56 and 58 extend to different extents and meet end to end. The edge region 56 extends to a significantly greater extent than the edge region 58. They comprise respective longitudinal edges 76 and 78 joined end to end. As a result the wall 34 is doubled in the region of the reservoir compartment 40.

Figure 7:
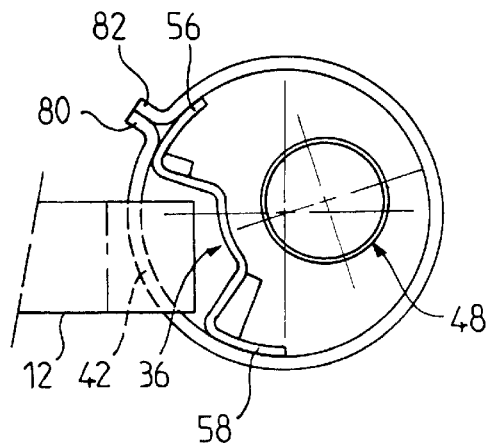

The embodiment shown in FIG. 7 is almost the same as that in FIG. 3, the main difference being that the tubular wall 34 comprises two border regions 80, 82 folded towards the outside of the collection box and joined together. In this case too, the edge region 56 of the separation wall 36 covers the two border regions 80 and 82.

The invention is not limited to the embodiments described above by way of example but also applies to other alternatives. Thus, the tubular wall 34 may have cylindrical shapes which are not circular. The edge regions of the separation wall will in each case have a suitably adapted shape.

Furthermore, although the invention has been described with particular reference to a condenser, it may apply to other types of heat exchanger.

What is claimed is:

1. A collection box with an integrated reservoir for a heat exchanger, comprising:
   a unitary tubular wall having two longitudinal ends located adjacent each other; and
   a separation wall disposed inside the tubular wall to define a collection compartment and a reservoir compartment, the tubular wall being equipped with spaced holes for receiving ends of a bundle of tubes;
   wherein the separation wall comprises a central core prolonged on either side by a first edge region and by a second edge region configured to be soldered to the inside of the tubular wall, said first edge region extending along the inside of said tubular wall across each longitudinal end.

2. The collection box of claim 1, wherein the tubular wall is a circular cylinder and the first and the second edge regions of the separation wall each have the profile of a portion of a circular cylinder.

3. The collection box of claim 1, wherein adjacent longitudinal ends are joined at their respective cut edges.

4. The collection box of claim 1, wherein the first and second edge regions of the separation wall extend to substantially the same extent.

5. The collection box of claim 1, wherein the central core of the separation wall comprises a part which is a portion of a circular cylinder.

6. A collection box for a heat exchanger, comprising:
a tubular wall having adjacent longitudinal ends;
a separation wall disposed inside the tubular wall defining a collection compartment and a reservoir compartment comprising a center portion separated from the tubular wall, a first and second radial portion extending from either side of the center portion towards said tubular wall, and a first and second edge region extending from the respective first and second radial portions along the tubular wall; and
wherein said first edge region extends across all the longitudinal ends.

7. The collection box according to claim 6, wherein the tubular wall is a circular cylinder and the first and the second edge regions of the separation wall each have the profile of a portion of a circular cylinder.

8. The collection box according to claim 6, wherein adjacent longitudinal ends are joined at their respective cut edges.

9. The collection box according to claim 6, wherein the first and second edge regions of the separation wall extend to substantially the same extent.

* * * * *